United States Patent
Kimmerling

(10) Patent No.: US 10,248,986 B2
(45) Date of Patent: Apr. 2, 2019

(54) METHOD AND SYSTEM FOR SEARCH REFINEMENT

(71) Applicant: Kurt L. Kimmerling, New York, NY (US)

(72) Inventor: Kurt L. Kimmerling, New York, NY (US)

(73) Assignee: Kurt Kimmerling, Brooklyn, NY (US)

( * ) Notice: Subject to any disclaimer, the term of this patent is extended or adjusted under 35 U.S.C. 154(b) by 0 days.

(21) Appl. No.: 15/585,723

(22) Filed: May 3, 2017

(65) Prior Publication Data

US 2017/0236187 A1    Aug. 17, 2017

Related U.S. Application Data

(63) Continuation of application No. 14/521,697, filed on Oct. 23, 2014.

(60) Provisional application No. 61/906,072, filed on Nov. 19, 2013.

(51) Int. Cl.
*G06F 17/30* (2006.01)
*G06F 7/00* (2006.01)
*G06Q 30/06* (2012.01)

(52) U.S. Cl.
CPC ..... *G06Q 30/0631* (2013.01); *G06F 17/3053* (2013.01); *G06F 17/3056* (2013.01); *G06F 17/30268* (2013.01); *G06F 17/30867* (2013.01); *G06Q 30/0627* (2013.01); *G06Q 30/0643* (2013.01)

(58) Field of Classification Search
CPC .................................................. G06F 17/3053
USPC .......................................................... 707/723
See application file for complete search history.

(56) References Cited

U.S. PATENT DOCUMENTS

| | | | |
|---|---|---|---|
| 6,701,207 B1 * | 3/2004 | Gazzuolo | G06Q 30/02 33/2 R |
| 6,999,971 B2 * | 2/2006 | Latarche | G06F 17/30321 |
| 7,428,554 B1 * | 9/2008 | Coberley | G06F 19/28 707/999.003 |
| 8,700,614 B1 * | 4/2014 | Diller | G06Q 30/0201 707/723 |
| 9,087,078 B2 * | 7/2015 | Becherer | G06F 17/30247 |
| 9,087,090 B1 * | 7/2015 | Cormier | G06F 17/30979 |
| 9,129,041 B1 * | 9/2015 | Cormier | G06F 17/30979 |
| 9,240,016 B2 * | 1/2016 | Cronin | G06F 17/30539 |
| 9,483,548 B2 * | 11/2016 | Becherer | G06F 17/30247 |

(Continued)

*Primary Examiner* — Pavan Mamillapalli
(74) *Attorney, Agent, or Firm* — Faegre Baker Daniels LLP

(57) ABSTRACT

A search refinement method and system to select items from a plurality of items using a user device connected via the internet to a server apparatus. The server apparatus includes a database of items and item attributes. Images of a first subset of the items are transmitted to the user device where they are presented on a display. A change indication selected by a user of the user device is received by the server apparatus, the change indication including at least one of an attribute selection and a reference item selected from the first subset. Responsive to receiving the change indication, an item score is computed for each of the items based on the item's attributes and the change indication. Images of a second subset of the items are presented on the user device. Each time the user initiates a change indication, another subset is presented on the user device, and the user can iteratively refine the search by finding items similar to the items represented by the change indication.

26 Claims, 15 Drawing Sheets

(56) References Cited

U.S. PATENT DOCUMENTS

| | | | |
|---|---|---|---|
| 9,594,850 B2* | 3/2017 | Donneau-Golencer | G06F 17/3053 |
| 2007/0271254 A1* | 11/2007 | Iglesia | G06F 21/10 707/999.005 |
| 2009/0049038 A1* | 2/2009 | Gross | G06F 17/30867 |
| 2009/0276724 A1* | 11/2009 | Rosenthal | G06F 17/30696 715/771 |
| 2011/0078055 A1* | 3/2011 | Faribault | G06Q 30/02 705/27.2 |
| 2011/0099122 A1* | 4/2011 | Bright | G06Q 10/04 705/348 |
| 2011/0307504 A1* | 12/2011 | Agrawal | G06F 17/30973 707/766 |
| 2012/0054060 A1* | 3/2012 | Kundu | G06Q 30/0603 705/26.5 |
| 2012/0150831 A1* | 6/2012 | Sun | G06F 17/30867 707/706 |
| 2013/0212531 A1* | 8/2013 | Yoshida | G06F 3/0485 715/829 |
| 2014/0089295 A1* | 3/2014 | Becherer | G06F 17/30247 707/722 |
| 2016/0117327 A1* | 4/2016 | Zhou | G06N 99/005 707/723 |

* cited by examiner

METHOD AND SYSTEM FOR SEARCH REFINEMENT

CROSS-REFERENCE TO RELATED APPLICATIONS

The present application is a continuation of and claims priority to U.S. patent application Ser. No. 14/521,697 filed Oct. 23, 2014 titled "METHOD AND SYSTEM FOR SEARCH REFINEMENT and claims the benefit of U.S. Provisional Patent Application No. 61/906,072 filed Nov. 19, 2013 titled "METHOD AND SYSTEM FOR SEARCH REFINEMENT", the entire disclosures of which are expressly incorporated herein by reference.

FIELD OF THE DISCLOSURE

The disclosure relates generally to a search system and a method. More particularly, the disclosure relates to a system and a method for refining search results.

BACKGROUND OF THE DISCLOSURE

When Internet shopping, people often find items that they like but wish they could change. For instance, a woman might like the cut of a dress, but she might like it even more if the dress were longer and sleeveless. Or perhaps she would like a similar dress with a different back or color. Given the large number of dress variables and corresponding options, it can be extremely challenging and time consuming for her to conduct additional searches to find the best alternatives. There is a need to more effectively help individuals find the items that most closely match what they are looking for.

SUMMARY

A search refinement method and system are disclosed. The method may be implemented with the system, which may include a processing device and processing instructions embedded in one or more non-transitory computer readable medium and structured to cause the processing device to implement the method disclosed herein. The method enables users to find a desired item in a large pool of items by finding similar items based on explicit or implicit item attribute selections, more quickly than with traditional filtering techniques.

In embodiments disclosed herein, the method comprises establishing an internet connection between the processing device and a user device; accessing a database of items and item attributes; transmitting to the user device images of a first subset of the items and user interface instructions structured to render the images on the user device; and receiving via the internet connection a change indication selected by a user of the user device. The change indication includes at least one of an attribute selection and a reference item selected from the first subset. The method further comprises, responsive to receiving the change indication, computing an item score for each of the items based on the item's attributes and the change indication; forming, based on the item scores, a second subset of the items; and serving user interface instructions structured to render images of the second subset of the items on the user device.

In embodiments disclosed herein, the method comprises accessing a recommendation set of items having item attributes; receiving from a user an indication of a reference item, the reference item having reference item attributes; receiving an item attribute selection from the user; and computing item scores for each of the items based on the item attributes, the item attribute selection, and the reference item attributes. The method further comprises ranking the items based on the item scores; and serving user interface instructions for rendering images of at least a subset of the items on the user device, the at least a subset of the items selected according to the ranking of the items.

In embodiments disclosed herein, a refinement system comprises a database of items and item attributes; and user interface instructions operable in a user device and structured to cause the user device to receive images of a first subset of the items and of a second subset of the items, to present the images, and to transmit a change indication selected by a user of the user device. The change indication includes at least one of an attribute selection and a reference item selected from the first subset. The system further comprises a server apparatus including a processing device, one or more non-transitory computer readable medium, and a plurality of modules including a communication module structured to establish an internet connection between the processing device and a user device, to transmit the images of the first subset of items and of the second subset of items, and to receive the change indication; a database interface module structured to access the database of items and item attributes; and a user interface module structured to generate the user interface instructions. The system further comprises a processing module structured to compute an item score for each of the items based on the item's attributes and the change indication; and to form, based on the item scores, the second subset of the items.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein.

Figure 1:
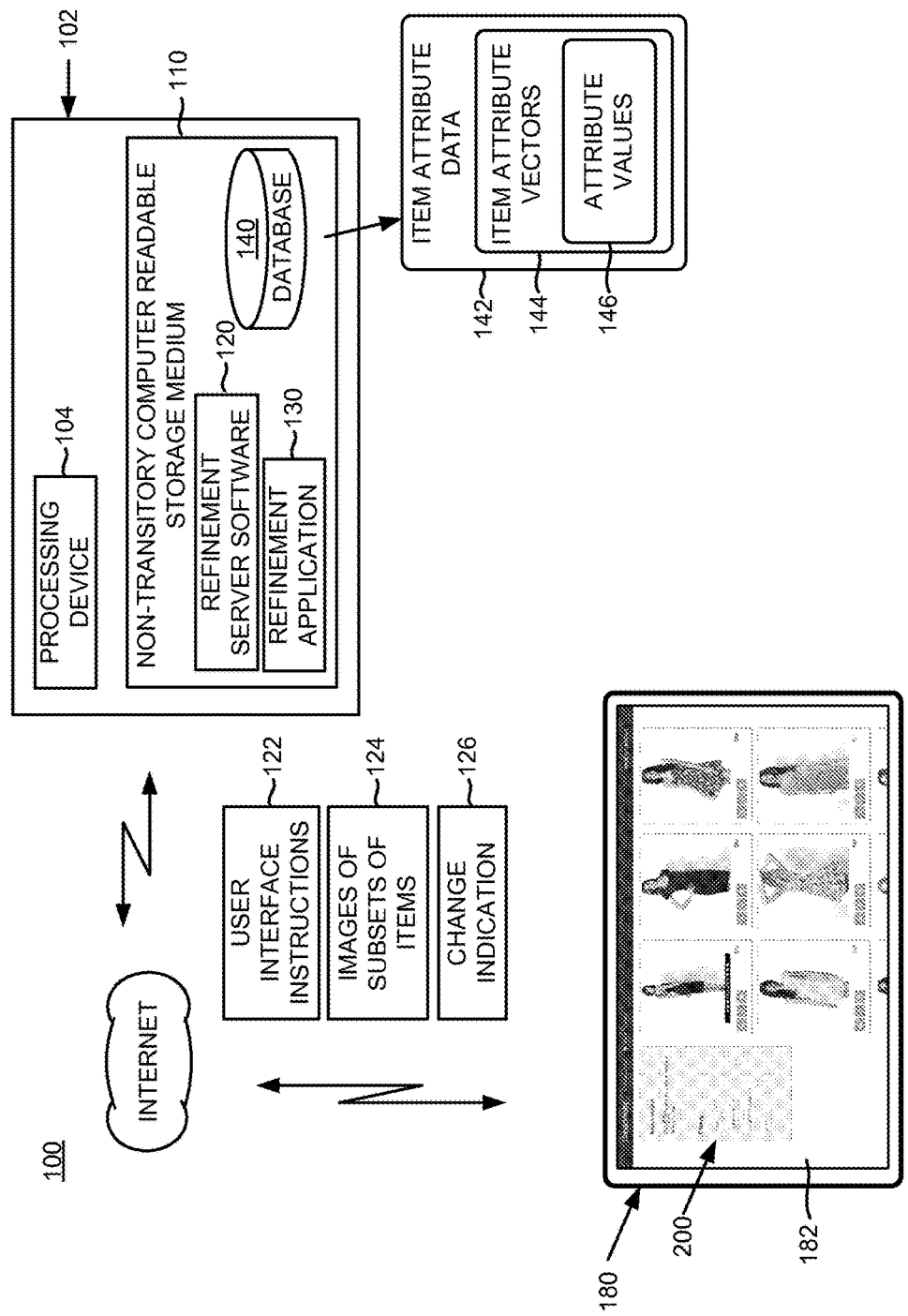
FIGS. 1 and 1A are block diagrams of a search refinement system according with an example set forth in the disclosure.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE DISCLOSURE

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

A search refinement method and a system are disclosed. The method is executable at least in part by a processing device according to processing instructions embedded in one or more non-transitory computer readable medium. In one embodiment, the method is configured for accessing a data-structure including a plurality of items and generating instructions to generate, in a user device, graphical displays and control objects configured to assist a user in refining item selections.

Also presented herein are embodiments of a non-transitory computer readable medium and a system including the non-transitory computer readable medium, the non-transitory computer readable medium having processing instructions embedded therein for implementing the foregoing methods when processed by a processing device. In addition to the non-transitory computer readable medium and the processing instructions, the system includes the processing device.

The search refinement may also be based on explicit user preference data. Explicit user preference data may be obtained with a system and method for soliciting information as described in commonly owned U.S. patent application Ser. No. 13/795,168, filed Mar. 12, 2013, titled "System and Method for Eliciting Information," said application incorporated herein by reference in its entirety.

Figure 1A:
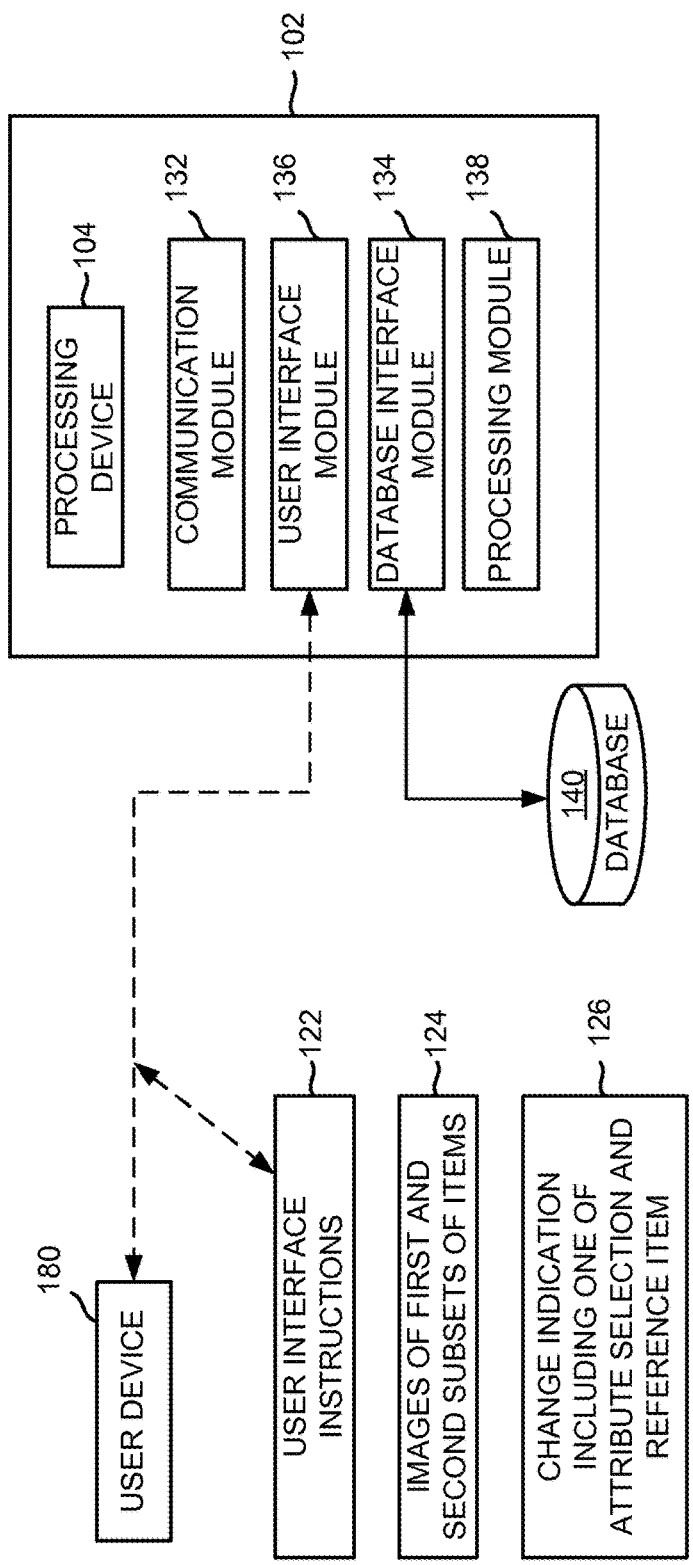

FIGS. 1 and 1A are block diagrams of an embodiment of a search refinement system 100. System 100 includes server apparatus 102 including a processing device 104, a non-transitory computer readable medium 110 having stored therein a refinement server software 120, a refinement application 130, and a database 140. While exemplified herein as single apparatus, server apparatus 102 may comprise an integrated system or a distributed system. Processing device 104 may comprise one or several processing devices working in concert. Similarly, non-transitory computer readable storage medium 110 may comprise one or several devices configured to store processing instructions and data, including hard drives, discs, read-only-memory, random-access-memory, and any other non-transitory storage device. Refinement application 130 includes a plurality of modules described below. Database 140 includes data-structures for storing information including a plurality of items and item attribute data 142. Exemplary item attribute data 142 including item attribute vectors 144 and attribute values 146 are shown.

Server apparatus 102 includes a communication module 132 structured to establish an internet connection between processing device 104 and a user device 180. As used herein, modules may comprise instructions stored in memory or implemented in a circuit or implemented in both hardware and software. Exemplary circuits include integrated circuits, and electronic devices mounted on circuit boards. Communication module 132 also transmits images 124 of subsets of items to user device 180, which may be read from database 140 by a database interface module 134. Database interface module 134 may a module of refinement application 130. Communication module 132 also receives user instructions, selections, and choices, which refinement software 130 processes to implement embodiments of the search refinement method described herein. Exemplary selections include a change indication 126, and a reference item selected from subsets of items. Server apparatus 102 communicates with user device 180 via the Internet, wirelessly or thorough a wired connection, as is well known in the art. User device 180 may be referred to as a "client device".

Server apparatus 102 also includes a user interface module 136 structured to generate user interface instructions 122, or code, operable in user device 180 and structured to cause user device 180 to receive images of a first subset of the items and of a second subset of the items; to present the images; and to transmit a change indication selected by a user of the user device. User interface module 136 may a module of refinement application 130. User device 180 includes a visual display 182 to present thereon the images and control objects. Exemplary user interface instructions 122 include hypertext markup language (HTML) instructions for creating web pages and other information that can be displayed with a web browser resident in user device 180. Exemplary user devices include computers, tablets, mobile phones and any other device including hardware capable of receiving HTML instructions and presenting web pages with a visual display.

Server apparatus 102 also includes a processing module 138 structured to compute an item score for each of the items based on the item's attributes and the change indication; and to form, based on the item scores, the second subset of the items. Processing module 138 is a module of refinement application 130.

Figure 2:
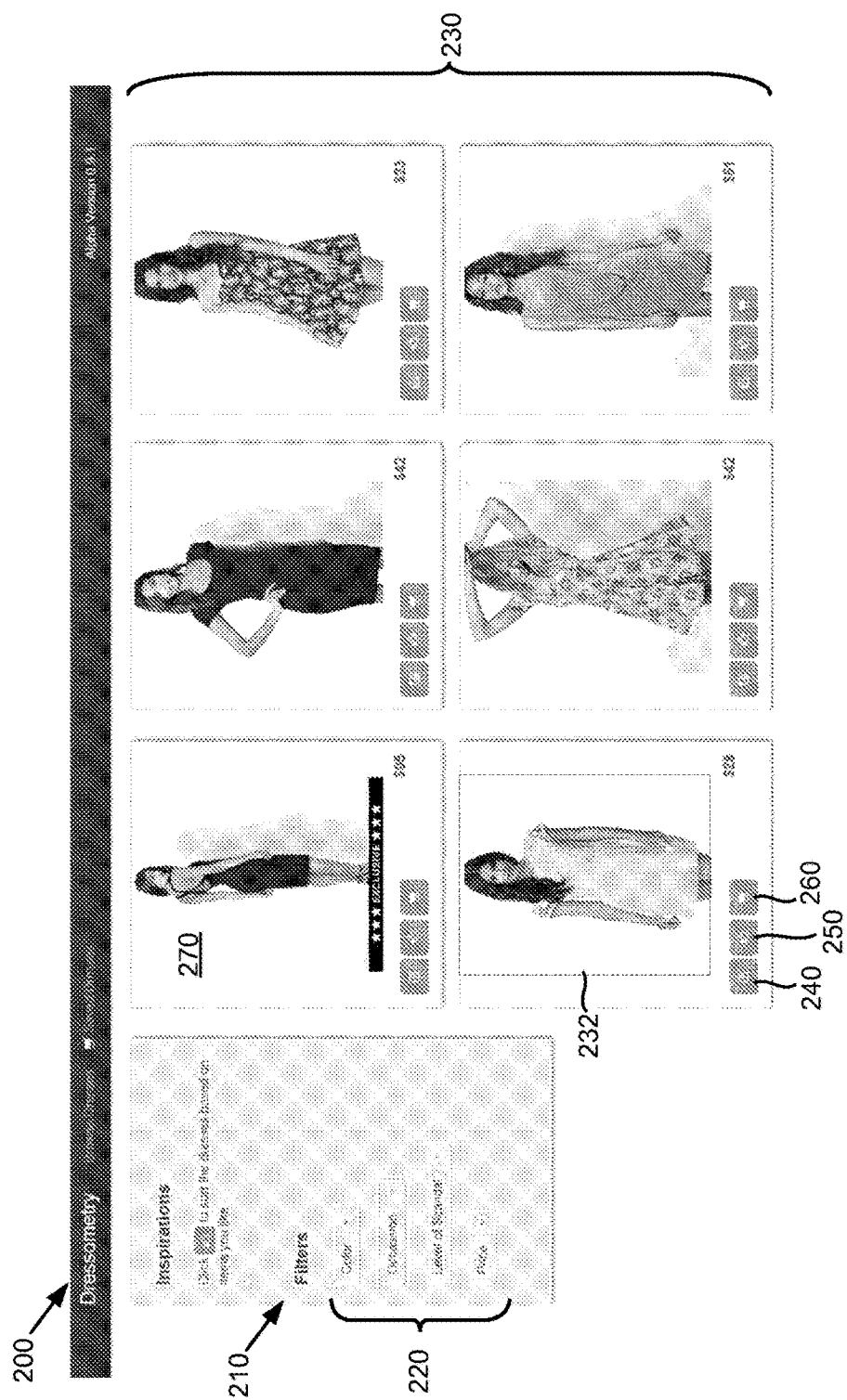
FIGS. 2 to 6 are screenshots generated by instructions provided by a refinement application of the search refinement system of FIG. 1.

FIGS. 2-6 are screenshots of web pages presented on a user device display generated by user interface instructions provided by refinement application 130. FIG. 2 illustrates a screenshot 200 including an attributes panel 210 including attribute drop-boxes 220 configured to enable a user to select attributes. The user selects attributes to refine the search. The items presented to the user are then changed, either by excluding items through filtering or lack of similarity. In one example, the plurality of items are filtered based on the user selections. In another example, a subset of the plurality of items that have attributes similar to those of the selections is identified, and the user can further refine the search by making further changes to the set of similar items. Screenshot 200 also includes a plurality of item panels 230 and control objects configured to refine item selections, as explained below.

In one embodiment, a search begins when the user selects an item category to indicate the kind of item the user wishes to find. Exemplary item categories include dresses, work clothes, jewelry and any other category of merchandise. In the present embodiment, a website dedicated to a category, dresses, is described. Thus, in the present embodiment the user selects a category by accessing a website named "Dressometry". The website is hosted by refinement server software 120. It should be understood that the system and method presented herein are applicable to any category. In one variation of the present embodiment, upon accessing the website, the refinement system presents items from the plurality of items. The user selects one item, referred to as the "reference item". The search refinement process is then performed by the refinement system, with user input, to find an item similar to the reference item. The plurality of items have previously been determined and categorized during setup of the refinement system. The present variation is discussed in additional detail with reference to FIGS. 9 and 13. Another variation of the present variation, referred to as "design your own dress", is discussed with reference to FIGS. 9 to 14. Of course, the method is applicable to any merchandise category.

The plurality of items represents all the items that may be presented to a user during the search refinement process, and may be referred to as a "recommendation set". An item has attributes, and the attribute data includes attribute values corresponding to each attribute of each item. The attribute values for a particular item comprise an item attribute vector.

attribute values for the category are multiplied by a preference weight. For example, the color of a dress may be more important than the sleeve type, so the color attribute category may be multiplied by a preference weight of X to represent importance. X may equal 2, for example, to represent higher importance, or 0.5, for example, representing lower importance.

In another variation, attribute values other than binary values are selected to represent known relationships between attribute subcategories. For a short sleeve dress the vector would be (−0.5, 0, 1, −1, −0.5, −1, −1, −1, −1, −1) to reflect a relationship, for example, between short sleeve and sleeveless, and short sleeve and off the shoulder. These values would then be normalized across all the items in the recommendation set. Table 1 below illustrates an example of such relationship information:

TABLE 1

| SLEEVES | Sleeves_LongSleeves | Sleeves_ThreeQuarter | Sleeves_ShortSleeves | Sleeves_OneSleeve | Sleeves_Off_the_Shoulder | Sleeves_Cutout | Sleeves_Sleeveless | Sleeves_Straps | Sleeves_Halter | Sleeves_Strapless |
|---|---|---|---|---|---|---|---|---|---|---|
| Sleeves_LongSleeves | 1 | 0 | −0.5 | −1 | −1 | −1 | −1 | −1 | −1 | −1 |
| Sleeves_ThreeQuarter | 0 | 1 | 0 | −1 | −1 | −1 | −1 | −1 | −1 | −1 |
| Sleeves_ShortSleeves | −0.5 | 0 | 1 | −1 | −0.5 | −1 | −1 | −1 | −1 | −1 |
| Sleeves_OneSleeve | −1 | −1 | −1 | 1 | −1 | −1 | −1 | −1 | −1 | −1 |
| Sleeves_Off_the_Shoulder | −1 | −1 | −0.5 | −1 | 1 | −0.5 | −1 | −1 | −1 | −1 |
| Steeves_Cutout | −1 | −1 | −1 | −1 | −0.5 | 1 | −1 | −1 | −1 | −1 |
| Sleeves_Sleeveless | −1 | −1 | −1 | −1 | −1 | −1 | 1 | 0 | −0.5 | −1 |
| Sleeves_Straps | −1 | −1 | −1 | −1 | −1 | −1 | 0 | 1 | −1 | −0.5 |
| Sleeves_Halter | −1 | −1 | −1 | −1 | −1 | −1 | −0.5 | −1 | 1 | −1 |
| Sleeves_Strapless | −1 | −1 | −1 | −1 | −1 | −1 | −1 | −0.5 | −1 | 1 |

In the present embodiment, before the search refinement process is implemented, the item attribute data is compiled by obtaining information about items in a particular category, e.g. dresses, and determining the attributes for each attribute category of each item. Dress attribute categories include neck style, sleeve style, length, bust style, waist fit, hips fit, bottom style, back style, primary color, highlight color, brand, price occasion etc. An item may have attribute categories and subcategories. Each subcategory may be further subdivided to provide any desired level of refinement granularity. Exemplary neck style subcategories include heart neck, crew neck, V-neck, straight neck, collared, turtle neck, and asymmetric. Exemplary sleeve style subcategories include long sleeved, three quarters sleeved, short sleeved, sleeveless, one shoulder, halter and strapless.

Each item is categorized as true or false for each subcategory. For some attribute categories (such as occasion), multiple subcategories could be true. For other attribute categories (such as length), only one subcategory could be true. The set of binary values (1s and 0s) that characterize an item are transformed into the item attribute vector. The attribute values are obtained by normalizing the binary values across all of the recommendation set. First, calculate the average and standard deviation of the 1s and 0s for each attribute subcategory across all of the recommendation set (e.g. the average score for color-black across all dresses is 0.2). Then, for each item in the recommendation set, and each attribute subcategory, subtract the average from the binary value and divide the result by the standard deviation. The item attribute vectors are then stored in the item attribute data.

In one variation, attribute categories and subcategories are weighed based on preference data. For example, the preference data may indicate that one attribute category is more important than another. To scale an attribute category, the Referring again to FIG. 2, the user can activate attribute drop-boxes 220 to filter items in the recommendation set or select similar items, depending on the programming for each attribute. In one example, attribute categories may be used to filter and to refine the search. In another example, some attribute categories are only used to filter the recommendation set and cannot be used to refine the search. In the present embodiment, the attribute categories in attribute panel 210 include color, occasion, level of scandal and price. The attribute category "level of scandal" can filter but cannot be used to refine the search. In this context, refining the search refers to finding items similar to reference items. By contrast, filtering excludes items based on the filter criteria. Thus, a selected "level of scandal" such as "get noticed" causes the system to exclude all items except items satisfying the "get noticed" level of scandal. If the "level of scandal" were used as a refinement attribute, items would be selected by multiplication of the reference item vector (modified by the chosen "level of scandal" attribute (e.g. "get noticed")) by the item attribute vectors to compute scores which determine similarity. It would be mathematically possible for an item which does not satisfy the "get noticed" attribute to still be shown to the user, where such item would be excluded if the same attribute were used as a filter.

Any number of filtering criteria may be used. As shown in screenshot 200, criteria include color, occassion, level of scandal and price. If the user specifies that the item price should be below $50, then only items that are priced strictly less than $50 are presented. With respect to dressess, if the user specifies that the dress color should be black, then only black dresses are presented.

Screenshot 200 further illustrates a plurality of item panels 230, each including an item button 232 showing an image of the item, and a plurality of control objects including an item adjustment button 240, an item selection button 250, and a shopping cart button 260. One of the item buttons includes a selected item image 270 to represent that a user selected that item to continue processing. The item identified by numeral 270 becomes the reference item in the subsequent refinement process. The user may select the item by activating the corresponding item button 232, item adjustment button 240, or item selection button 250. The user may also activate a shopping cart button 260 to purchase the selected item. Use of shopping cart buttons to purchase items is well known in the art and will not be further described.

If the user activates a drop-box 220, the refinement process includes filtering the recommendation set accordingly (or finding similar items), sorting the items, and serving a web page for the user device to present the filtered and sorted items.

Figure 3:
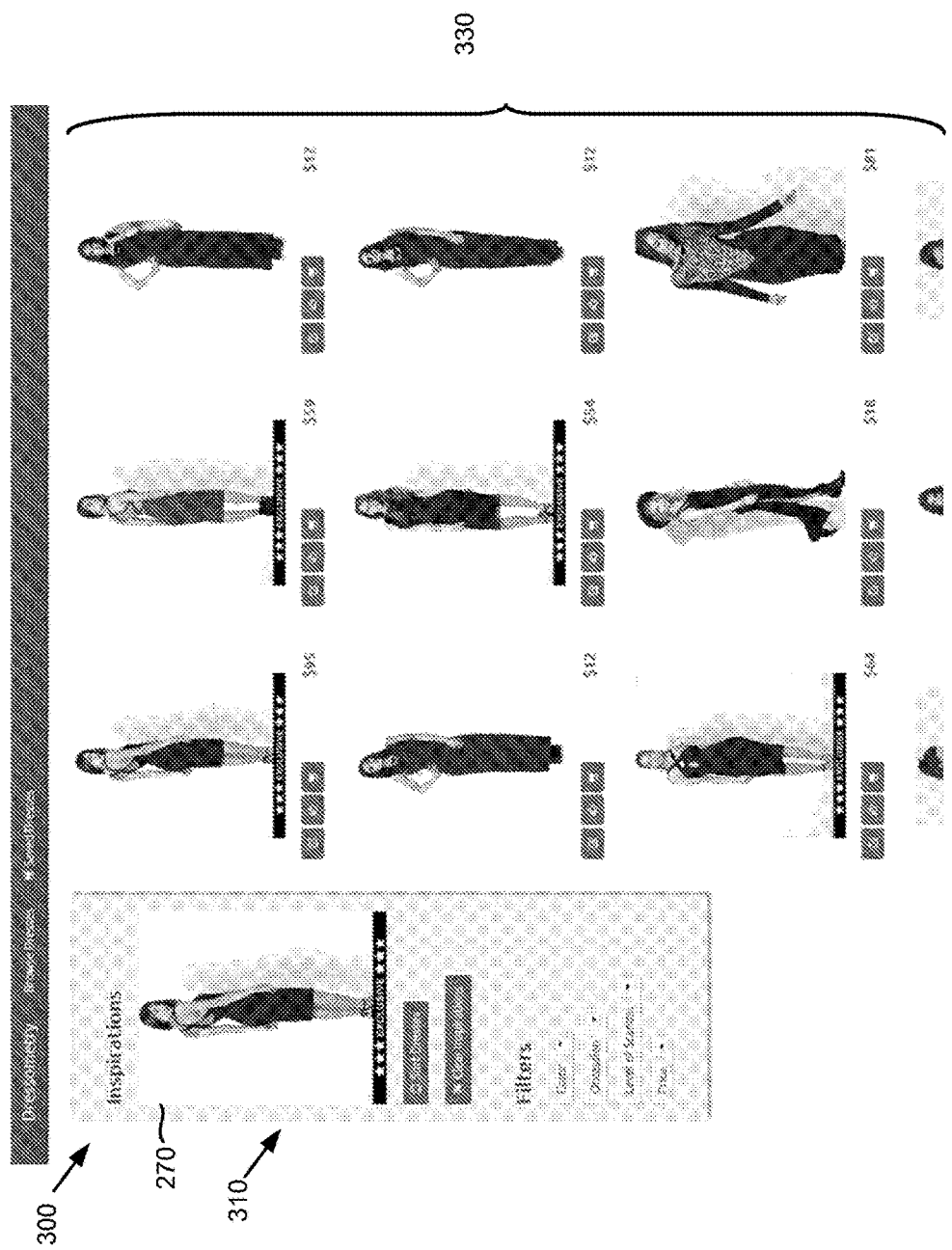

If the user activates item selection button 250, the refinement process includes re-scoring the items based on the selection, sorting the re-scored items, and serving a web page for the user device to present the re-scored and sorted items. A selected item image 270 may also be shown to enable the user to build a "refinement history". A partial screenshot 300 of an exemplary web page rendered after activation of an item selection button 250 is shown in FIG. 3. Screenshot 300 illustrates a filtering panel 310 which is similar to filtering panel 210, with the addition of the image of the image of the reference item. A plurality of item panels 330 are shown. Item panels 330 are similar to item panels 230, except that the items have been re-sorted based on the selection of the reference item by the user.

Figure 4:
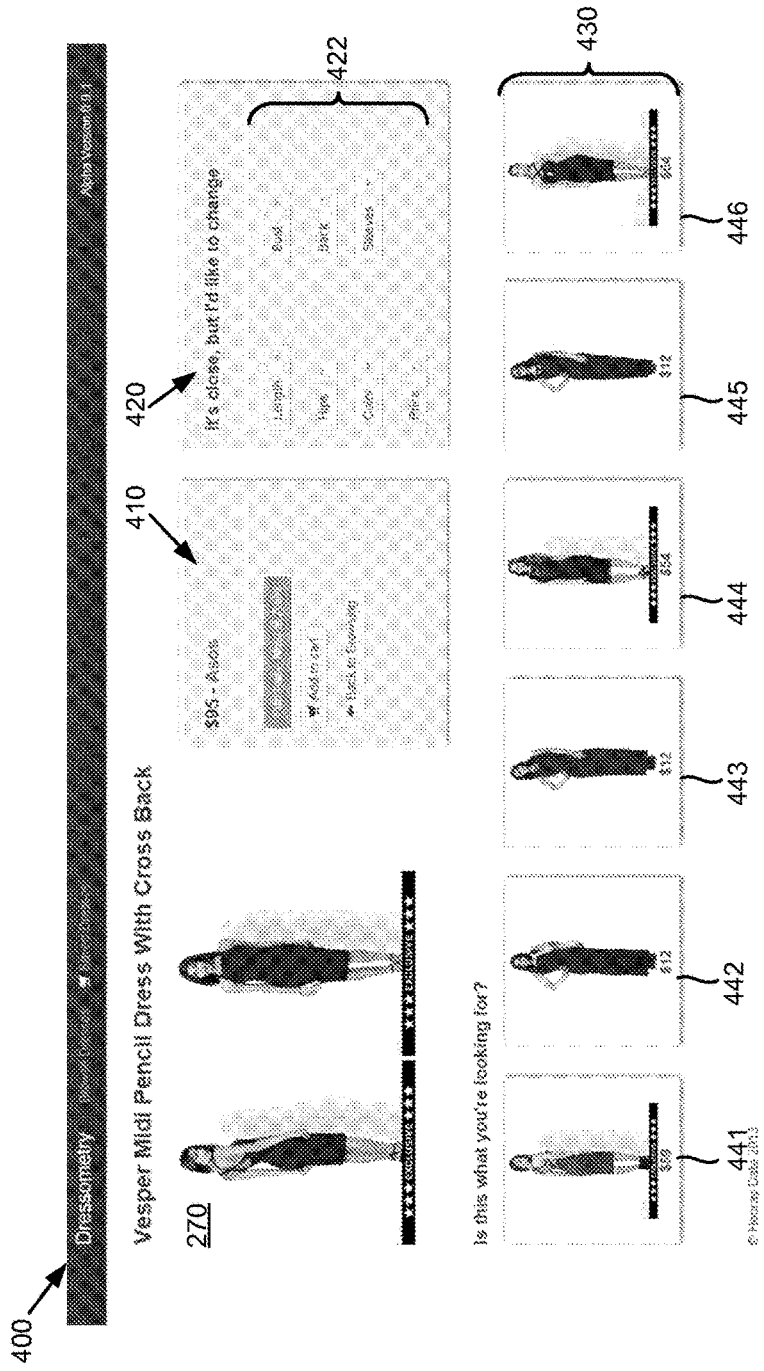

If the user activates an item button 232 or an item adjustment button 240, the refinement process includes re-scoring the items based on the selection, sorting the re-scored items, and serving a web page for the user device to present the re-scored and sorted items for refining the search. A partial screenshot 400 of an exemplary web page rendered after activation of an item adjustment button 240 is shown in FIG. 4.

Screenshot 400 illustrates selected item image 270, a navigation panel 410 including navigation buttons including "purchase now", "add to cart", and "back to browsing". The "purchase now" button redirects the browser to the website of the merchant of the item. The functions of the "add to cart", and "back to browsing" buttons are self-explanatory and well known navigation controls. Screenshot 400 also illustrates an adjustments panel 420 showing a plurality of attribute subcategory drop-boxes 422 which the user can activate to adjust a subcategory and thereby refine the search. On the lower portion of screenshot 400 are shown a plurality of item panel 430, including item panels 441-446 sorted based on the user's selection of the reference item.

Figure 5:
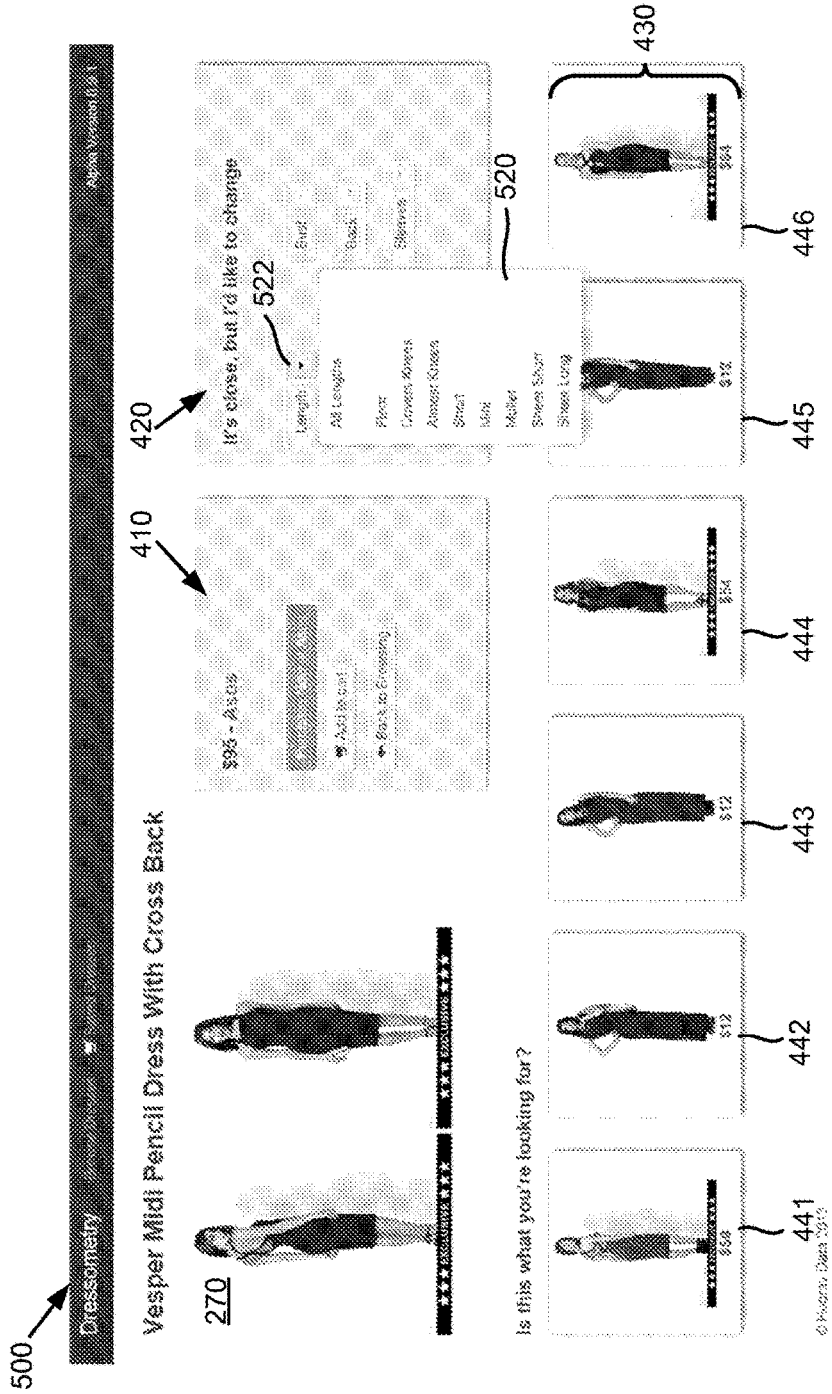
Figure 6:
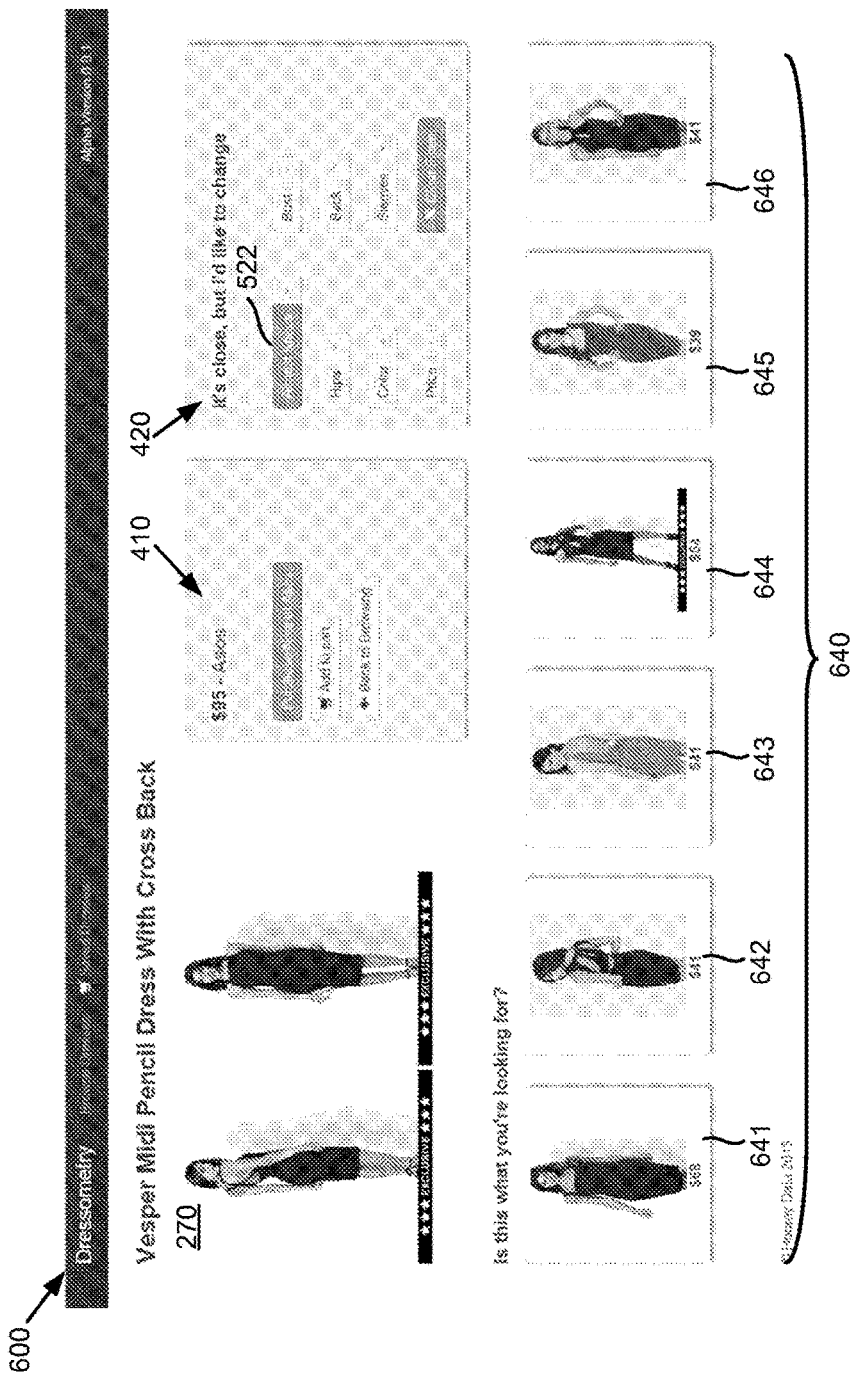

FIGS. 5 and 6 are partial screenshots 500 and 600 of exemplary web pages further illustrating the refinement process. Screenshot 500 illustrates the sub-category choices 420 presented by drop-box 522 corresponding to length. Screenshot 500 illustrates that the user selected "almost knees" in the sub-category "length". On the lower portion of screenshot 600 are shown item panels 641-646 refined and sorted based on the selection. It can be seen that the items shown in item panels 442, 443 and 445 (shown in FIG. 5) are full-length dresses and none of the items shown in item panels 641-646 are full-length dresses. The items shown in item panels 641-646 are determined based on the combination of the reference item and the sub-category selection. The refinement process will now be described in more detail below.

The reference item has an attribute vector, which is referred to for the reference item as the "reference vector". When the user selects attributes to change, the system generates a new vector including the selected (changed) attributes and the attributes of the reference item that remain unchanged. The new vector is referred to as the "adjusted attribute vector". For example, if the reference item is a red long sleeve dress that is short in length, and the user would like a black dress instead, then the color subcategory of the reference vector is adjusted to reflect the black color. As shown in example 1 below, the old value for red and black (1, −1) may be changed to (1, 100) as shown in the first and second rows (below the header row), to arrive at an adjusted attribute vector {100, 1, −1, 0, 1, −1, −1, 0, 1}.

Example 1

| Category | Subcategory | Reference Vector | Adjusted Attribute Vector |
|---|---|---|---|
| Color | Black | −1 | 100 |
| Color | Red | 1 | 1 |
| Color | White | −1 | −1 |
| Sleeve | Short Sleeve | 0 | 0 |
| Sleeve | Long Sleeve | 1 | 1 |
| Sleeve | Sleeveless | −1 | −1 |
| Length | Floor length | −1 | −1 |
| Length | Knee length | 0 | 0 |
| Length | Short | 1 | 1 |

As shown in example 2 below, in an alternative example, the old value for red and black (1, −1) may be changed to (−1, 1) as shown in the first and second rows (below the header row), to arrive at an adjusted attribute vector {1, −1, −1, 0, 1, −1, −1, 0, 1}.

Example 2

| Category | Subcategory | Reference Vector | Adjusted Attribute Vector |
|---|---|---|---|
| Color | Black | −1 | 1 |
| Color | Red | 1 | −1 |
| Color | White | −1 | −1 |
| Sleeve | Short Sleeve | 0 | 0 |
| Sleeve | Long Sleeve | 1 | 1 |
| Sleeve | Sleeveless | −1 | −1 |
| Length | Floor length | −1 | −1 |
| Length | Knee length | 0 | 0 |
| Length | Short | 1 | 1 |

As shown in example 3 below, the refinement system may enable a user to adjust multiple attributes, simultaneously or step-wise, in different attribute categories as illustrated by example 3, where color and length have been changed, as shown in the first and eighth rows (below the header row).

Example 3

| Category | Subcategory | Reference Vector | Adjusted Attribute Vector |
|---|---|---|---|
| Color | Black | −1 | 100 |
| Color | Red | 1 | 1 |
| Color | White | −1 | −1 |
| Sleeve | Short Sleeve | 0 | 0 |
| Sleeve | Long Sleeve | 1 | 1 |
| Sleeve | Sleeveless | −1 | −1 |
| Length | Floor length | −1 | −1 |
| Length | Knee length | 0 | 100 |
| Length | Short | 1 | 1 |

As shown in example 4 below, the refinement system may also enable a user to adjust multiple attributes simultaneously within the same attribute category as illustrated by example 4, where color black and white have been changed, as shown in the first and third rows (below the header row).

Example 4

| Category | Subcategory | Reference Vector | Adjusted Attribute Vector |
|---|---|---|---|
| Color | Black | −1 | 100 |
| Color | Red | 1 | 1 |
| Color | White | −1 | 100 |
| Sleeve | Short Sleeve | 0 | 0 |
| Sleeve | Long Sleeve | 1 | 1 |
| Sleeve | Sleeveless | −1 | −1 |
| Length | Floor length | −1 | −1 |
| Length | Knee length | 0 | 0 |
| Length | Short | 1 | 1 |

After the refinement system receives instructions corresponding to the user's adjustments, the refinement system calculates scores for each item in the recommendation set by multiplying the adjusted attribute vector by each of the item attribute vectors. The items are then ranked based on the scores and the top ranked items are presented to the user. The user may then choose, among other choices, an item. The selected item may be a reference item for another round of adjustments. The process may be repeated by the user indefinitely.

As shown in example 5 below, the refinement system may also enable a user to stipulate that they don't want an attribute. Example 5 below shows where the user has stipulated not Short Sleeves, as shown in the fourth row (below the header row).

Example 5

| Category | Subcategory | Reference Vector | Adjusted Attribute Vector |
|---|---|---|---|
| Color | Black | −1 | 100 |
| Color | Red | 1 | 1 |
| Color | White | −1 | 100 |
| Sleeve | Short Sleeve | 0 | −100 |
| Sleeve | Long Sleeve | 1 | 1 |
| Sleeve | Sleeveless | −1 | −1 |
| Length | Floor length | −1 | −1 |
| Length | Knee length | 0 | 0 |
| Length | Short | 1 | 1 |

In another embodiment, described further with reference to FIGS. 9-14, the system does not require the user to initially choose a reference item. Instead, the user can input attributes of a desired reference item and an adjusted attribute vector is constructed from the attribute inputs (such as shape and color). Then the recommendation set is ordered and the top matches are presented. The user can then input new refinements and new options are presented.

The search refinement method may also be based on preference data. Preference data may be obtained with a system and method for soliciting information as described in commonly owned U.S. patent application Ser. No. 13/795,168 filed Mar. 12, 2013, titled "System and Method for Eliciting Information," said application incorporated herein by reference in its entirety. The preference data may comprise user preference data and item preference data. To incorporate preference information in the refinement method, the item attribute vectors are augmented with preference attributes derived by reduced dimensionality analysis. For example, if the item attribute vectors have eight attributes, and there are four preference attributes in the preference data, the attribute vectors can be adjusted by adding the preference attributes to form twelve-attribute attribute vectors. The scores and rankings are computed as before, except that the adjusted, or enhanced, attribute vectors are used in the computations.

In a further embodiment, the user's input is saved by the system as a query for future use. The query may include the reference item, filter criteria, and or alteration criteria. The query may be run to return the user to the prior refinement stage. For example, the user may name the query and, upon visiting the site again, may recall the query by name in any manner known in the art. The query may also be used by the system to automatically trigger events. Exemplary events include transmitting an email message, text message or social media message. To trigger the event, the system periodically runs the query and determines if the result set of items is different from previous results. The system then sends a message based on the differences. For example, the new result set may show that one of the high-score items is no longer available or that a new high score item has become available. If a pricing filter is included, the email may indicate if the new high score item is indicated due to a price drop, which allows a previously filtered item to be included in the results. In one variation, an event is triggered when new items whose score exceeds a predetermined threshold are identified by the new result set. For example, the threshold may be set to 90% of the score of the reference item, such that only items with the predetermined level of similarity trigger events.

In a yet further embodiment, the system compiles usage information including, for example, how many users access the site, how many item selections they make, and what they would like to change about items. The system may compile, with respect to a given item, 1) how many people viewed the item; 2) for each attribute category, what percentage of the time is it requested to change that attribute (e.g. 30% of the users who viewed the dress would like to change the length); and 3) for each attribute sub-category, what percentage of the time is it requested to change the item to include that sub-category attribute (e.g. 5% of users who viewed the dress wanted it to be a floor length dress instead of knee length). In a variation of a merchandizing method, the compiled change data (which may also be referred as adjustment or alteration data) is exported to a merchant. The merchant may then make supply and pricing decisions to correlate the user's preferences inferable from the change data with the merchant's product lines. Systems and methods for generating pricing information are described in commonly owned U.S. patent application Ser. Nos. 13/905,625 and 13/905,645, both filed May 30, 2013 and titled "System and Method for Generating Information," said applications incorporated herein by reference in their entirety.

In a still further embodiment, the system receives merchandize updates from merchants. The merchandize updates may include attributes and merchandizing criteria such as availability and discounts. Based on the merchandize updates, the system may transmit messages to users based on the execution of queries as described above. Even further, the system may utilize user preference data and send the messages to persons having preferences similar to the users whose queries triggered the events. Alternatively, the system may export the lists of similar users to merchants so that the merchants can send the messages.

Figure 7:
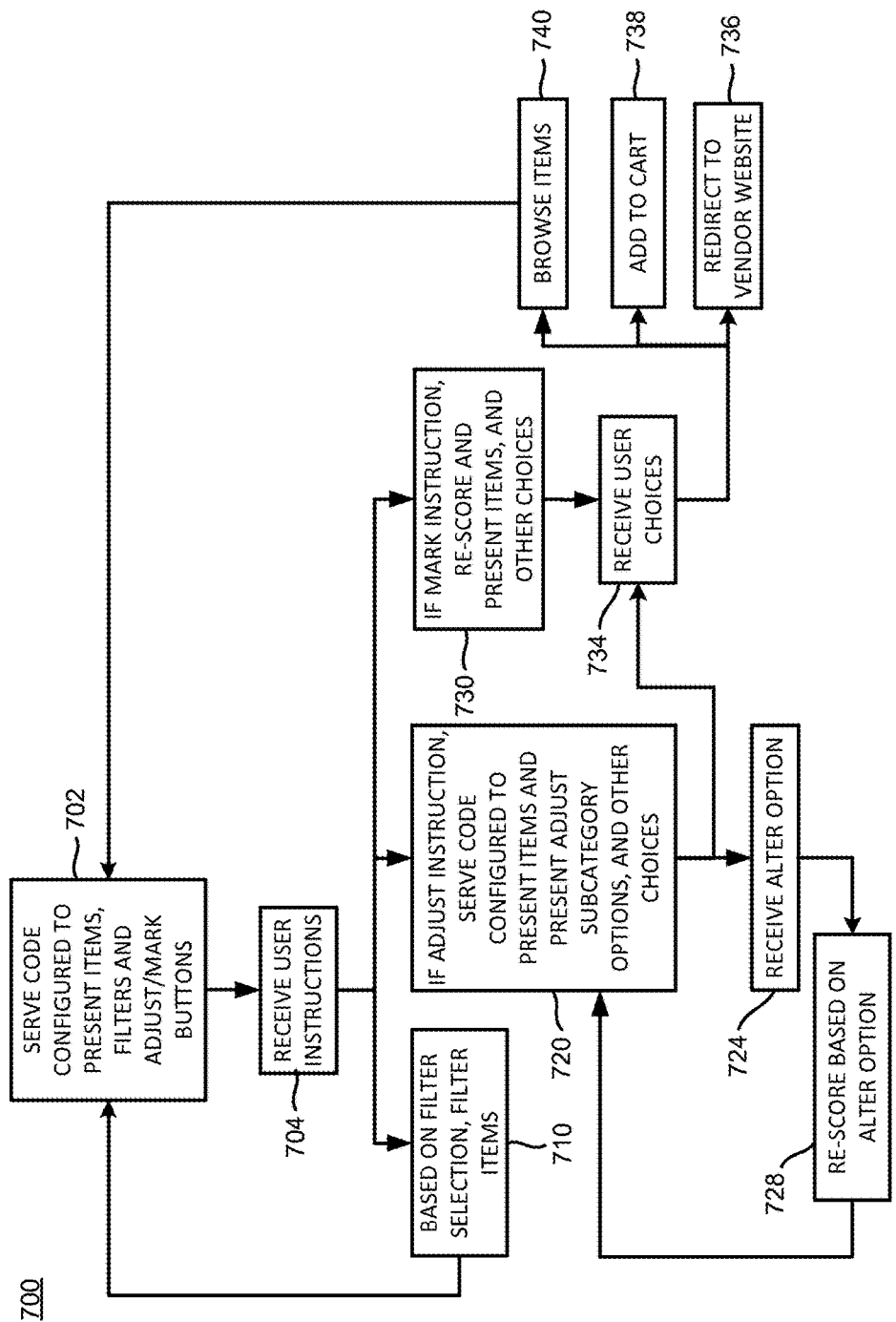
FIGS. 7 and 8 are flowcharts of a search refinement method according with examples set forth in the disclosure.

FIG. 7 is a flowchart 700 of an embodiment of a refinement method implemented with a refinement system, such as refinement system 100. At 702, the system serves code configured to present items, filters and alter/mark buttons. The code may be HTML code executable by a browser in a client device to present the items, filters and alter/mark buttons, or any other objects described herein. At 704, the system receives user instructions. The user may input instructions via a user device, and the user device may transmit the instructions to the system. The instructions include whether to change items, put the items in the closet, or mark items, and if to change items, the user's attribute selections.

If the instructions are to filter, at 710 the system filters the items based on the selected filter criteria. After filtering, the system serves code as described with reference to 702.

If the instruction is to adjust an item, at 720 the system serves code configured to present items, adjustment options, and other choices. The other choices may include returning to the main web page, purchasing an item, etc. At 724, the system receives an alter option. At 728, the system re-scores the items based on the selected adjustment to refine the results. The system then serves code configured to present the refined results. The system then proceeds to 720, at which time the user may refine again or may proceed in a different manner. As used herein, the terms "adjust", "alter", "change", and "filter" are used to indicate a change in the items presented to the user based on user selections, e.g. from a first subset of items to a second subset of items. "Adjust" and "alter" are interchangeable with "change". "Adjustment selection" is analogous with "change indicia".

If the instruction is to mark, at 730 the system re-scores the items based on the selected item (e.g. reference item). In re-scoring, the items most similar to the reference item receive higher scores. The system then serves code configured to present the re-scored items. The system then proceeds to 720, at which time the user may adjust the items again or may proceed in a different manner. At 734, the system receives user choices and proceeds to, for example, 736 to redirect the user to a vendor website, 738 to add the selected item to the shopping cart, and 740 to browse items.

Figure 8:
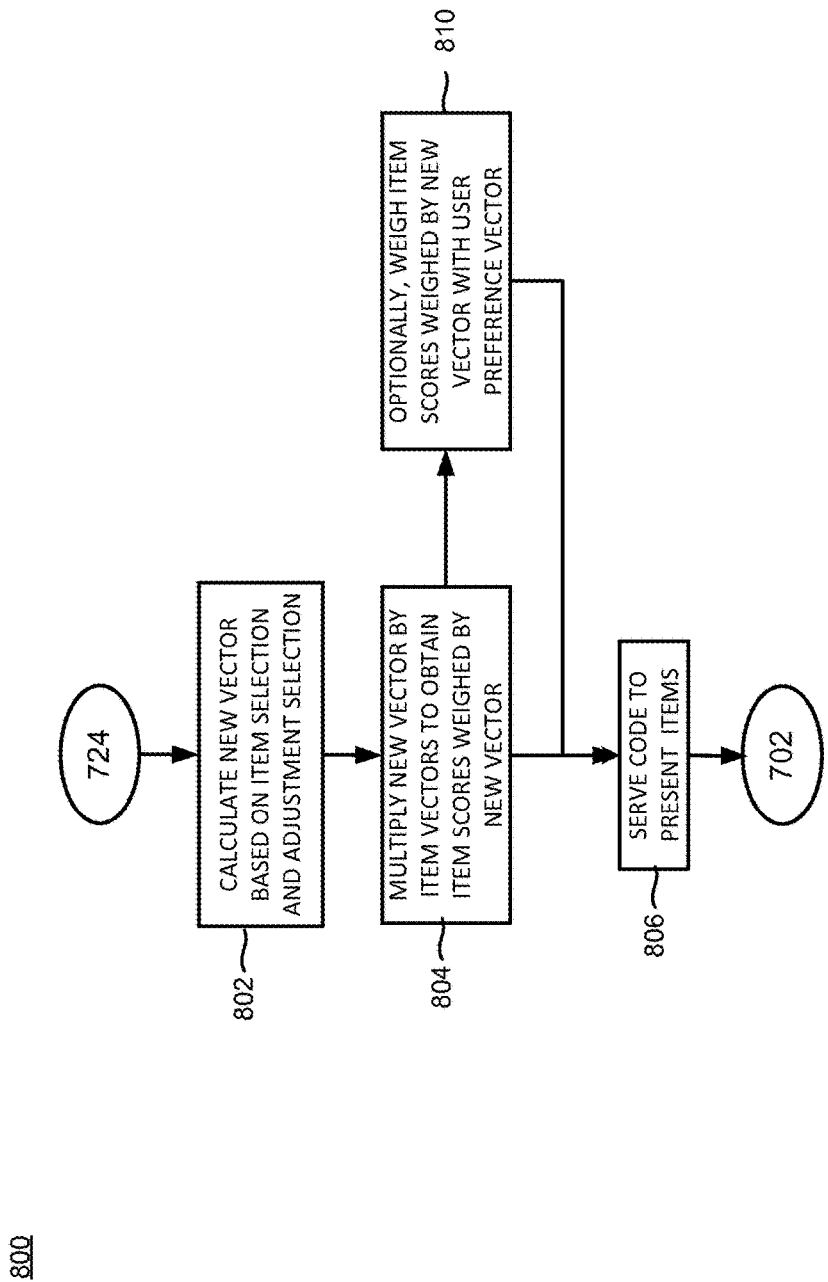

FIG. 8 is a flowchart 800 illustrating in further detail an algorithm executable after 724, where the system receives an adjustment selection. At 802, the system calculates a new vector based on the item selection and the adjustment selection. The system does so by substituting the attribute value of the adjustment selection for the corresponding attribute of the reference item, thus creating a new reference vector. At 804, the system multiplies the new vector by the item vectors to obtain item scores weighed by the new vector. Optionally, the system may weigh item scores with a preference vector. At 806, the system serves code to present items.

In a further embodiment, a search refinement method executable at least in part by a processing device according to processing instructions embedded in one or more non-transitory computer readable medium is provided. The method comprises accessing a recommendation set of items having item attributes; receiving from a user an indication of a reference item, the reference item having reference item attributes; receiving an item attribute selection from the user; computing item scores for each of the items based on the item attributes, the item attribute selection and the reference item attributes; ranking the items based on the item scores; and serving user interface instructions for rendering images of at least a subset of the items on the user device, the at least a subset of the items selected according to the ranking of the items.

In one variation thereof, the indication of a reference item is an image of the item transmitted by the user. In one example, the user snaps a photograph of the item with a mobile device and uploads the image to the system. The system may examine the image and automatically determine certain or all the attributes. If the item is a dress, the system may identify a body model and comparing the model to the image determine if the dress is long or short, sleeved or sleeveless, etc. Alternatively or additionally, the system may perform image analysis to identify a similar item in the recommendation set and use attributes of the similar item to supplement or complete the attributes vector of the item. Of course the system may also determine color. In another example, the uploaded image is examined by a person who categorizes the item.

In one variation thereof, the system receives an item attribute selection from the user by examining text. In one example, the user snaps a photograph of the item with a mobile device and uploads the image to the system. For example, the user may send the photograph with an email or text message. Before transmitting the message, the user may type the desired adjustment attribute. For example, the user may photograph a red dress and type "black". The system would then refine the search by identifying dresses similar to the uploaded dress image, but in black color.

In a further variation thereof, the system serves code to present images and adjustment options so that the user does not need to select an item and then select an adjustment after the items are re-sorted based on the reference item (e.g. the selected item). Receiving from a user an indication of a reference item is performed by receiving the item selection from a plurality of images presented to the user, and receiving an item attribute selection from the user is performed by receiving the attribute selection from a plurality of choices presented to the user. The images of the items and the attribute choices may be presented concurrently. The other method steps are performed as described above.

Figure 9:
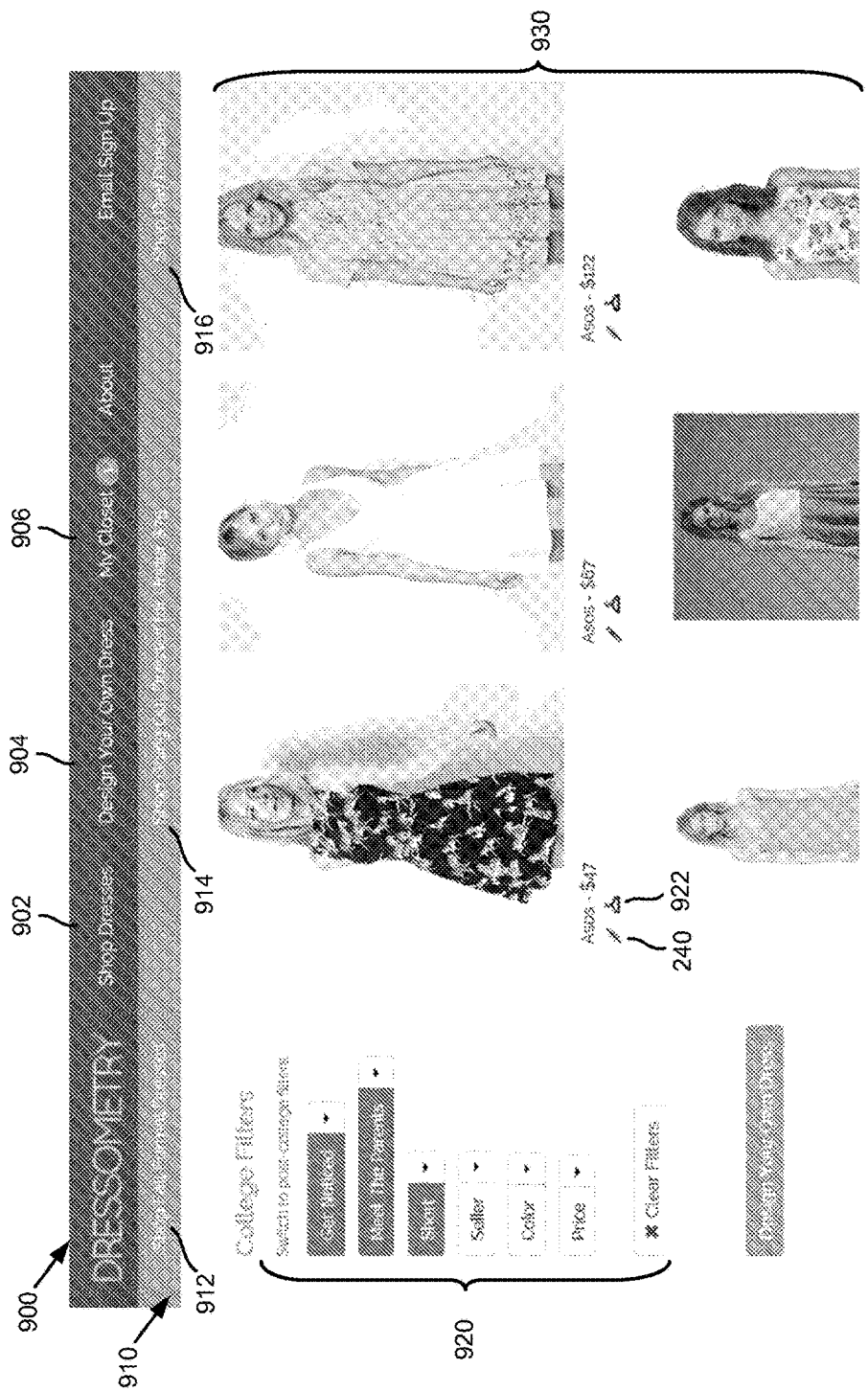
FIGS. 9 to 13 are screenshots generated by instructions provided by another embodiment of a search refinement application in accordance with a search refinement method set forth in the disclosure and described with reference to FIG. 14.

FIGS. 9-13 are screenshots of web pages generated by user interface instructions, or code, provided by a further embodiment of refinement application 130. FIG. 9 illustrates a screenshot 900 including a shop dresses button 902, a design your own dress (DYOD) button 904, a closet button 906, and a attribute panel 910 including filters 912, 914, and 916. Exemplary filters include formal dresses, dresses in a given price range, day dresses, and any other category that serves to separate the genus of dresses into large species. Screenshot 900 further includes attribute drop-boxes 920 configured to enable a user to select attributes on which to further refine a search by filtering or finding items having similar attributes. The subset of items presented to the user is then refined based on the user selections to more closely satisfy the user's desires. Screenshot 900 also presents a plurality of item panels 930 and control objects configured to refine item selections. Similarly to screenshot 200 described with reference to FIG. 2, each item panel 930 includes an image of an item and item adjustment button 240.

In the present embodiment, each item panel 930 also includes a closet-add button 922 configured to add the selected item to the closet. As described previously, selecting an item designates the selected item as the reference item in the subsequent refinement process. If the user activates closet-add button 922, the selected item is added to the closet, which is a list of selected items provided to facilitate review at a later time. The closet functions similarly to a shopping cart, without the purchasing features. The user can view the items in the closet by activating closet button 906.

A user can activate attribute drop-boxes 920 to refine the search, in which case the items shown in the plurality of item panels 930 may be referred to as a first set of items. Selecting one of the items or an attribute to change results in presentation of a second set of items, as described with reference to FIG. 13 and screenshot 970. Alternatively, activation of DYOD button 904 enables a user to design her own dress, a process which will be described with reference to FIGS. 10-13.

Figure 10:
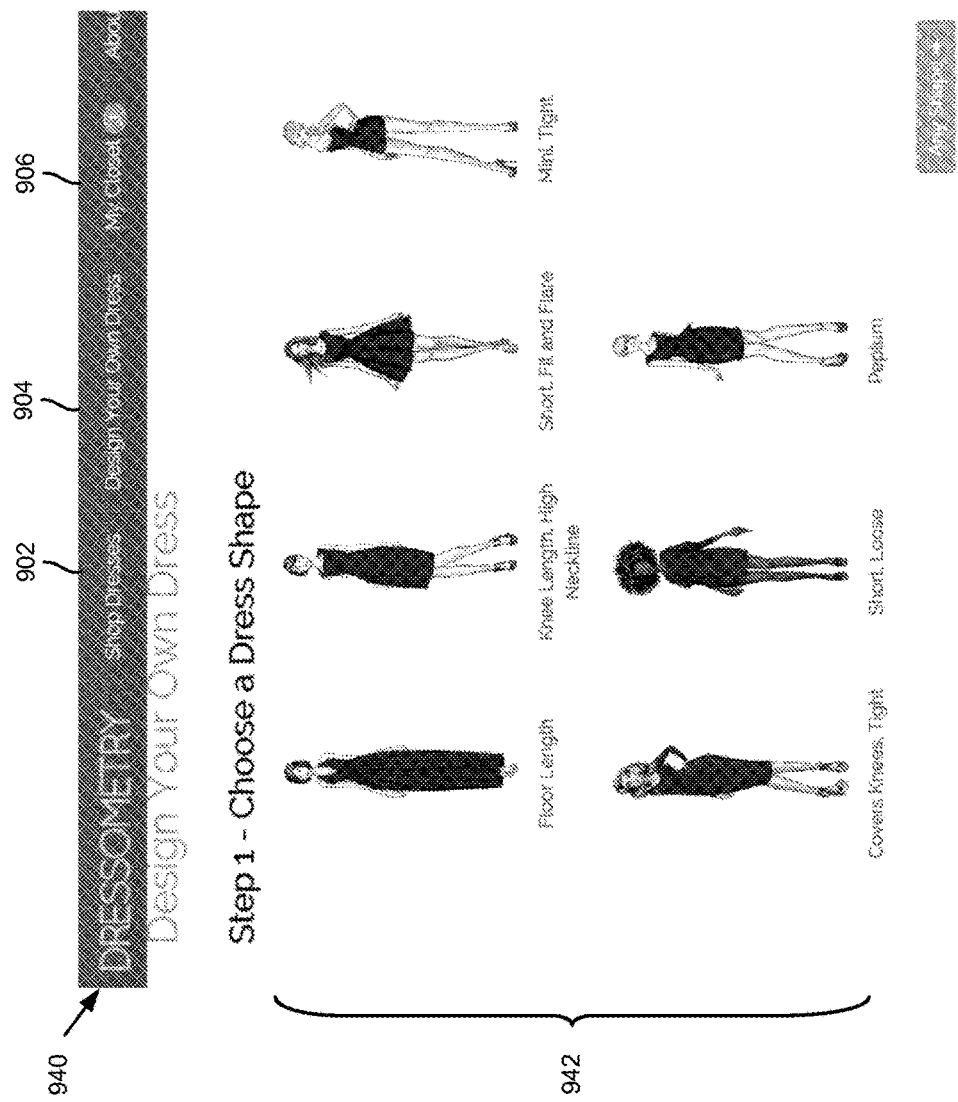
Figure 11:
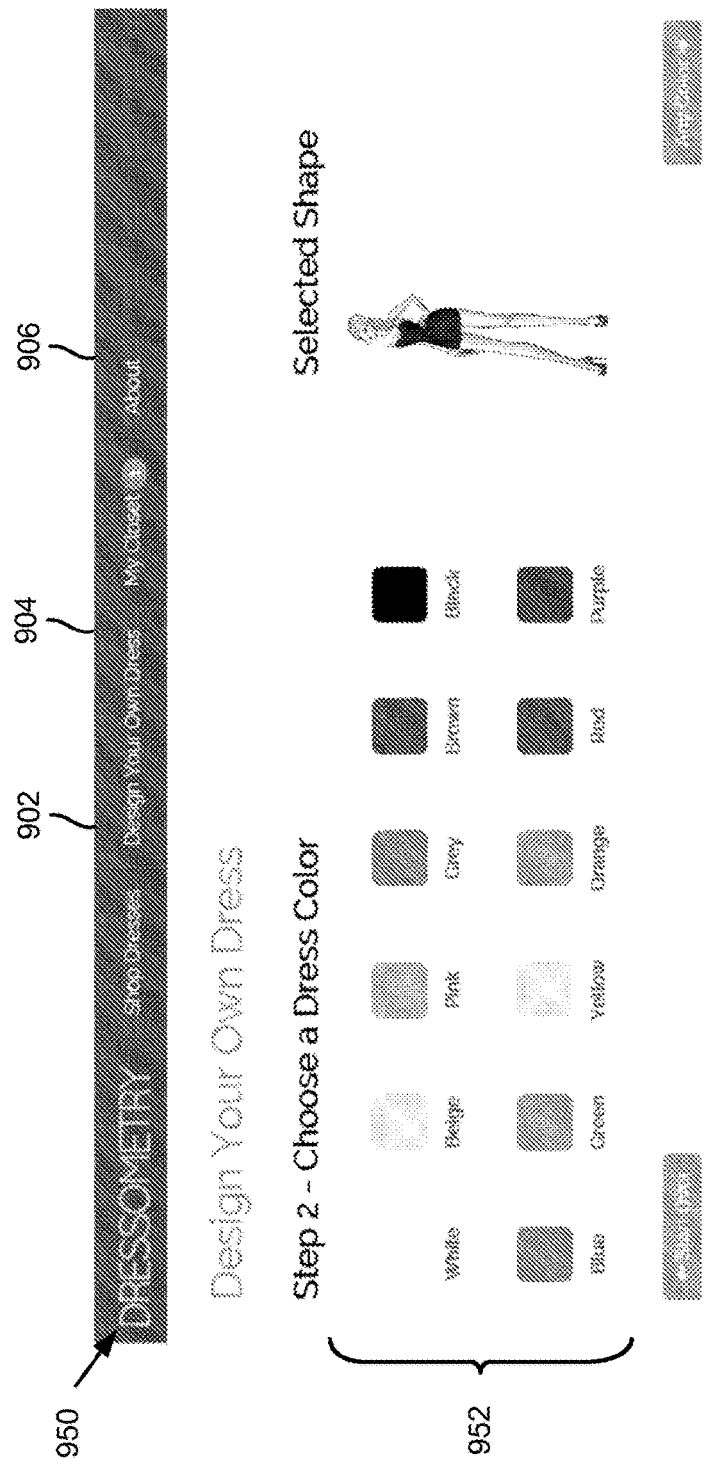

FIG. 10 illustrates a screenshot 940 including a first set of subcategory choices 942. As described below, a user may select a subcategory choice to refine the search. A subcategory may be based on one or more attributes. A vector comprising the attributes may be constructed to refine the search based on matching or similarity. Matching occurs when corresponding attributes match, and may be referred to as filtering. For example, for the attribute "dress shape", all items having the attributes that define a particular dress shape may be identified by matching the defining attributes. If the defining attribute is a short and loose dress, than only short and loose dresses will be a match. This can be accomplished by finding items whose attribute values corresponding to the defining attributes are equal to the values of the defining attributes for the selected, or reference, item. By contrast, similarity occurs when scores computed by multiplying the constructed vector by the item vectors satisfy a similarity criteria. For example, similarity may be determined if the scores exceed a certain value or are ranked highly, which would indicate a degree of similarity that can be predetermined. Thus, it is likely that similar items will include matching items and also items which do not match. For example, if the defining attribute is a short and loose dress, a dress that is very loose and neither long nor short may be highly ranked and therefore be considered similar, even though it is not short. FIG. 11 illustrates a screenshot 950 including a second set of subcategory choices 952, i.e. colors. Additional subcategories may be used to narrow the search.

Figure 12:
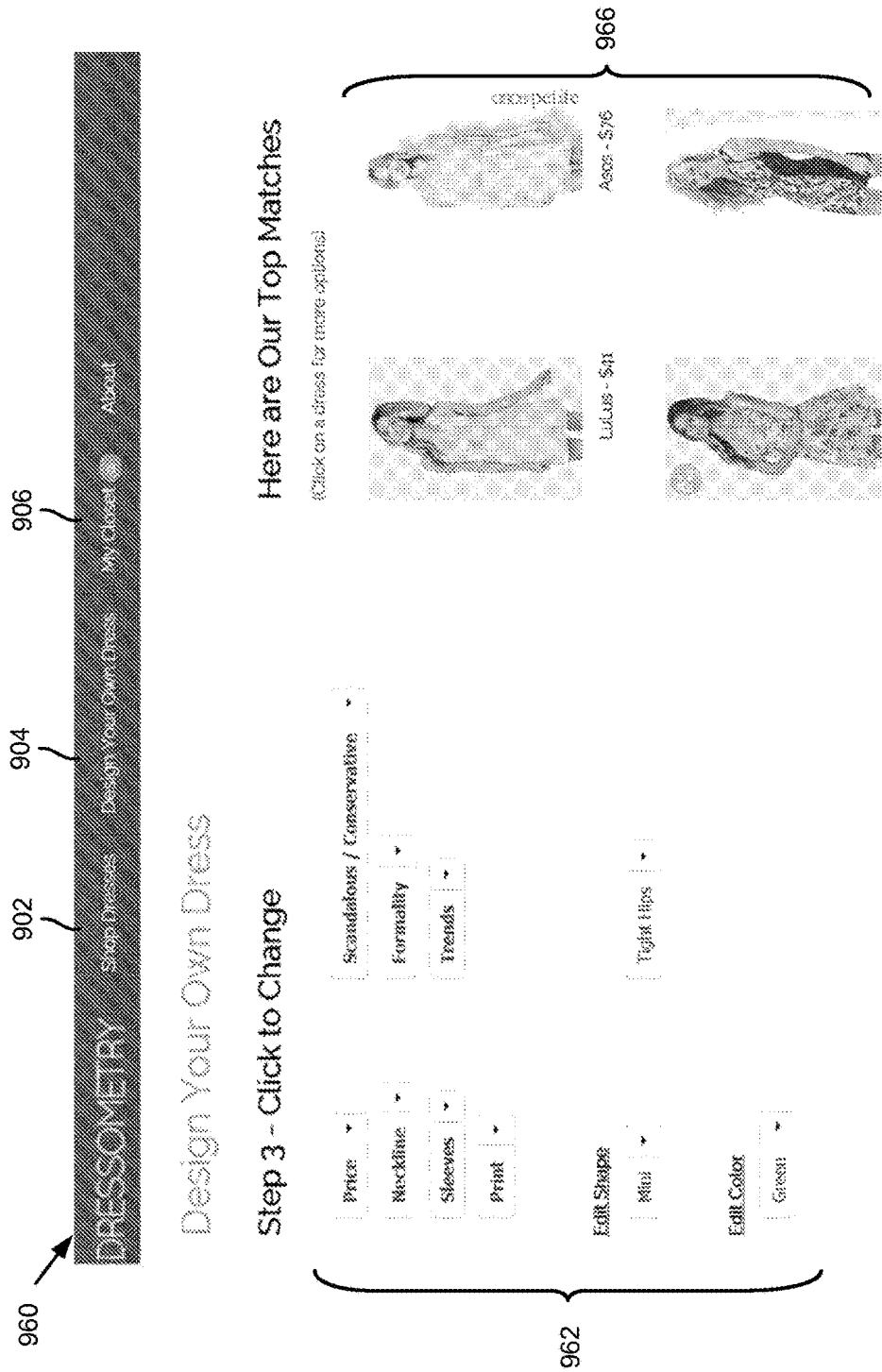

FIG. 12 illustrates a screenshot 960 including images of a first set 966 of items and attribute drop-boxes 962. The images were selected by refining the plurality items to only include items similar to items in the first and second subcategories. In a variation of the present embodiment, the items are selected by inclusively filtering items having attributes matching corresponding attributes of the first and second subcategories or by exclusively filtering items having attributes not matching corresponding attributes of the first and second subcategories. A user can select any of the attributes represented by attribute drop-boxes 962 to further refine the design. Any of the attribute drop-boxes 962 can be coded to refine the search based on matching or similarity. The user may also select one of the images as a reference item. The attributes of the reference item are then used to identify images of a second set of items. The attributes of the reference item may be combined with the attributes of the first and second subcategories. For example, a vector including attributes of the first and second subcategories, and additional attributes distinguishing the reference item from other items in the first set may be constructed to identify the second set. The refinement process may be repeated by the user.

Figure 13:

FIG. 13 illustrates a screenshot 970 including images of a second set 972 of items and attribute drop-boxes 976. The image of the reference item selected from screenshot 960 is also shown. The refinement process may be continued by the user by selecting an image from second set 972 or any attributes from attribute drop-boxes 976. A purchase button 978 is also provided, which when activated links the page to the site of the vendor of the selected item.

Figure 14:
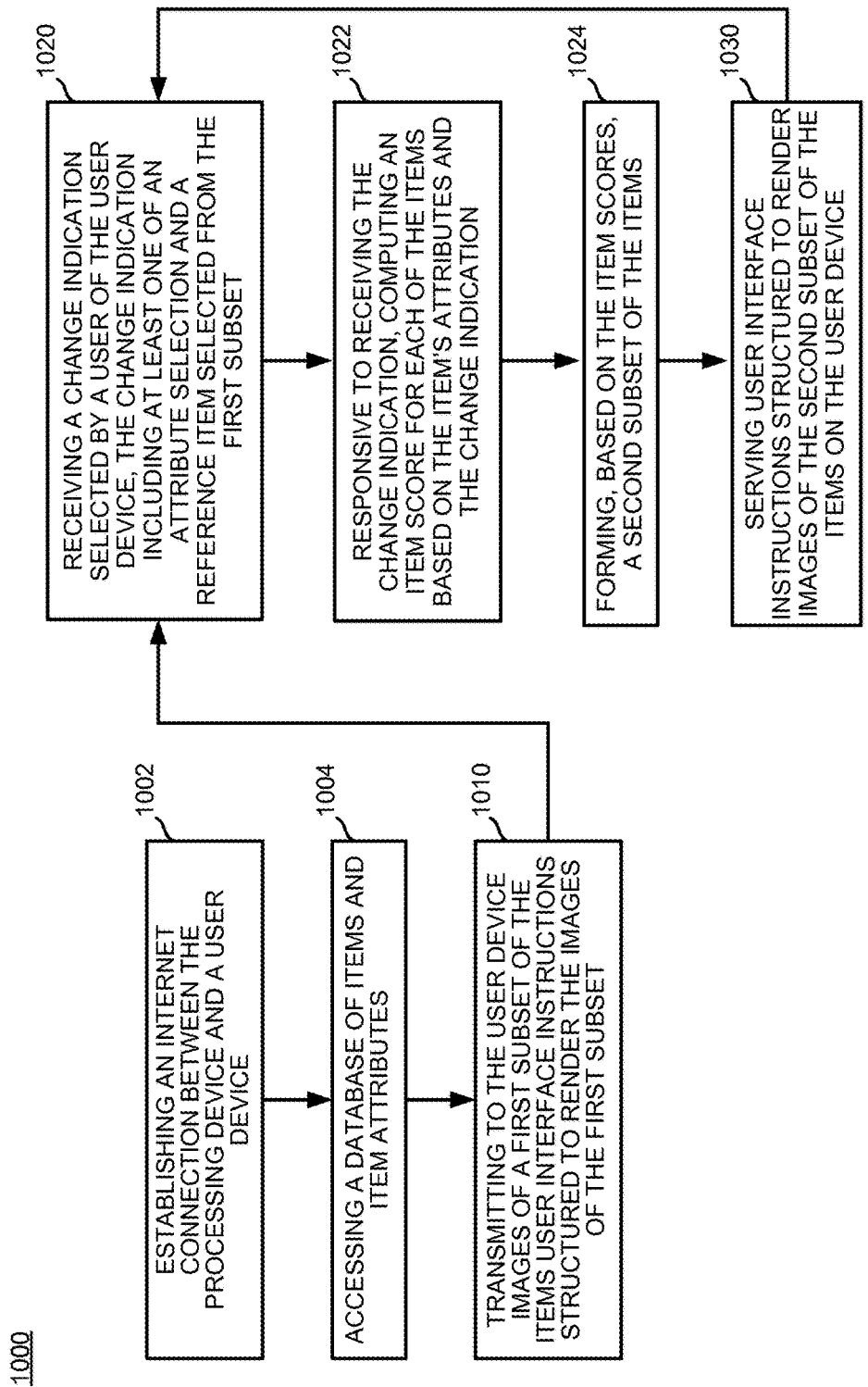
FIG. 14 is a flowchart of an embodiment of a search refinement method according with examples set forth in the disclosure.

A variation of the present embodiment will now be described with reference to a flowchart 1000 depicted in FIG. 14. The method is implemented by a processing device according to processing instructions embedded in one or more non-transitory computer readable medium. The processing instructions may be comprised, at least in part, by communication module 132, database interface module 134, user interface module 136, and processing module 138. The method begins at 1002, with establishing an internet connection between the processing device and a user device. The method continues at 1004, with accessing a database of items and item attributes.

The method continues at 1010, with transmitting to the user device images of a first subset of the items and user interface instructions structured to render the images of the first subset on the user device. Transmitting is responsive to the user accessing server apparatus 102, which the user may do with an internet browser. In another variation, a user device application, is served by server apparatus 102 and the user device application includes the rendering instructions and other instructions structured to perform the functions of the user interface instructions.

The method continues at 1020, with receiving via the internet connection a change indication selected by a user of the user device, the change indication including at least one of an attribute selection and a reference item selected from the first subset.

The method continues at 1022, with computing an item score for each of the items based on the item's attributes and the change indication, responsive to receiving the change indication. In one example, computing an item score includes multiplying a vector corresponding to the item's attributes to a change vector corresponding to the change indication.

The method continues at 1024, with forming, based on the item scores, a second subset of the items. In one example, forming a second subset of the items includes selecting the items with the highest scores. In another example, forming a second subset of the items includes: comparing the attributes of the items to the attributes corresponding to the change indication; and selecting items based on the comparison.

The method continues at 1030, with serving user interface instructions structured to render images of the second subset of the items on the user device. In one example, steps 1020-1030 implement a "click-to-change" feature, so that when the user "clicks" the image of an item, a drop-box for an attribute, or another "change" object on the user device, images of the second set of items, representing a refinement over the first set of items.

Embodiments of the refinement method and system have been disclosed. The embodiments include features which may be combined to build variations of the disclosed embodiments. For example, the "click-to-change" feature may be introduced before or after the "design your own dress" feature. Furthermore, attributes may be presented in any manner, with or separate from the display of sets of items, and the attribute selection objects may be coded to find similarities or matches, on an attribute by attribute basis. Advantageously, a user may navigate the entire set of items and iteratively find a subset of the items in an efficient manner.

In a further embodiment, a search refinement method, executable at least in part by a processing device according to processing instructions embedded in one or more non-transitory computer readable medium, comprises: accessing a recommendation set of items having item attributes; receiving from a user an indication of a reference item, the reference item having reference item attributes; computing item scores for each of the items based on the item attributes and the reference item attributes; ranking the items based on the item scores; and serving instructions for rendering images of at least a subset of the items on a user device, the at least a subset of the items selected according to the ranking of the items; responsive to the serving instructions for rendering images of at least a subset of the items on a user device, receiving an item attribute selection from the user; re-computing item scores for each of the items based on the item attributes, the item attribute selection and the reference item attributes; re-ranking the items based on the item scores; and serving second instructions for rendering images of at least a second subset of the items on the user device, the at least a second subset of the items selected according to the re-ranking of the items.

In one variation thereof, the method further comprises storing a query including the reference item and the item attribute selection. In one example, the method further comprises storing an alert parameter, periodically executing the query, and outputting an alert if the alert parameter is satisfied.

In one variation thereof, computing item scores for each of the items is based on the item attributes, the reference item attributes, and user preference data.

In one variation thereof, the reference item is in the recommendation set of items, and receiving from a user an indication of a reference item includes receiving a reference item selection corresponding to an image of an item selected by the user.

In one variation thereof, the reference item is not in the recommendation set of items, and the indication is an image of the reference item. The method further comprises receiving the reference item attributes before computing item scores for each of the items based on the item attributes and the reference item attributes.

In one variation thereof, the method further comprises compiling information including at least one of the received indication of a reference item and the received item attribute selection, and selling the information so compiled.

In one variation thereof, the method further comprises storing a query including at least one of the received indication of a reference item and the received item attribute selection. In one example, the method further comprises automatically running the query and sending messages based on query results.

In another embodiment, the search refinement method comprises accessing a recommendation set of items having item attributes; receiving from a user an indication of a reference item, the reference item having reference item attributes; receiving an item attribute selection from the user; computing item scores for each of the items based on the item attributes, the item attribute selection and the reference item attributes; ranking the items based on the item scores; and serving instructions for rendering images of at least a subset of the items on the user device, the at least a subset of the items selected according to the ranking of the items.

Additionally, explicit user preference information may be combined with the refinement criteria in any of the embodiments described above, so that scores represent not only the changes indicated by the change indicator, but also the user's explicit preferences. Explicit user preferences are elicited by asking better questions. The questions are derived from item preference data. The item preference data is processed, for example by principal component analysis, to identify pseudo-independent items, e.g. the principal components. Questions are then generated based on the pseudo-independent items. For example, a question may ask a user to choose one of a few pseudo-independent items. Better data results in better recommendations. Questions that involve choosing between pseudo-independent items are very efficient, so only a few questions are needed to determine a user's preferences. Therefore, users are less likely to lose interest in answering the questions and participating in the process. Even further, weights may be applied based on demographic information and user characteristics to reach the desired subset of items even quicker.

As used herein, an application, algorithm or, processing sequence, is a self consistent sequence of instructions that can be followed to perform a particular task. Applications may use data structures for both inputting information and performing the particular task. Data structures greatly facilitate data management. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

As used herein, the transitional term "comprising", which is synonymous with "including", or "containing", is inclusive or open-ended and does not exclude additional, unspecified elements or method steps. By contrast, the transitional term "consisting" is a closed term which does not permit addition of unspecified terms. While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A search refinement method carried out by a processing device according to processing instructions embedded in one or more non-transitory computer readable media, the method comprising:
  accessing a database of a plural integer N items, wherein:
    the database is structured so as to characterize each of the N items according to one or more qualitative-attribute categories that are each defined by a finite set of one or more qualitative-attribute subcategories, each qualitative-attribute category representing a respective type of physical characteristic of a given item, each qualitative-attribute subcategory representing a particular physical manifestation of the physical characteristic that the associated qualitative-attribute category represents, the database defining a total of a plural integer M qualitative-attribute subcategories; and
    each of the N items is associated in the database with a respective image and a respective M-element qualitative-attribute vector, each element of each qualitative-attribute vector being a numeric value that (i) corresponds to a respective different one of the M qualitative-attribute subcategories that are defined in the database, (ii) numerically indicates whether or not the corresponding qualitative-attribute subcategory is present in the corresponding item, and (iii) numerically reflects the degree of presence of the corresponding qualitative-attribute subcategory across all N items in the database;
  transmitting, to a user device, user interface instructions that are structured to render the images of a first subset of the N items on the user device;
  receiving, from the user device, a user-selected change indication that specifies (i) a user-selected reference item from the first subset and (ii) one or more user-specified qualitative-attribute subcategories that are not present in the user-selected reference item;
  responsive to receiving the user-selected change indication, generating an adjusted qualitative-attribute vector that is based on the qualitative-attribute vector of the user-selected reference item, and in which the respective numeric value that corresponds to each user-specified qualitative-attribute subcategory numerically indicates the presence of that qualitative-attribute subcategory;
  computing a respective item score for at least each of the N−1 items other than the user-selected reference item at least in part by multiplying the adjusted qualitative-attribute vector by the qualitative-attribute vector of the respective corresponding item;
  identifying a second subset of the N items based at least in part on the computed item scores; and
  transmitting, to the user device, user interface instructions that are structured to render the images of the second subset of the N items on the user device.

2. The method of claim 1, wherein identifying the second subset of the N items includes selecting for inclusion in the second subset the items with the highest computed item scores.

3. The method of claim 2, wherein the user interface instructions that are structured to render the images of the second subset of the N items on the user device are structured to render the images of the second subset of the N items on the user device in descending order of computed item score.

4. The method of claim 1, further comprising, prior to transmitting, to the user device, the user interface instructions that are structured to render the images of the first subset of the N items on the user device:
  transmitting, to the user device, user interface instructions that are structured to render images of a first set of qualitative-attribute-subcategory choices on the user device;
  receiving, from the user device, a user-selected qualitative-attribute subcategory from the first set of qualitative-attribute-subcategory choices; and
  identifying the first subset of the N items based at least in part on the user-selected
  qualitative-attribute-subcategory choice.

5. The method of claim 1, further comprising:
  receiving, from the user device, a user-selected filtering facet;
  if the filtering facet is inclusive, including in one or both of the first subset and the second subset only items matching the user-selected filtering facet; and
  if the filtering facet is exclusive, including in one or both of the first subset and the second subset only items not matching the user-selected filtering facet.

6. The method of claim 1, further comprising storing a query including the user-selected change indication.

7. The method of claim 6, further comprising:
  storing an alert parameter;
  periodically executing the stored query; and
  outputting an alert if the alert parameter is satisfied.

8. The method of claim 1, further comprising computing the numeric values for each of the elements of each of the qualitative-attribute vectors at least in part by:
  initializing each element of each qualitative attribute vector to either (i) a 0 if the corresponding qualitative-attribute subcategory is not present in the corresponding item or (ii) a 1 if the corresponding qualitative-attribute subcategory is present in the corresponding item;
  computing a respective average and a respective standard deviation of the initialized values for each respective qualitative-attribute subcategory; and
  subtracting the corresponding qualitative-attribute-subcategory average from each initialized element, and then dividing the result of that subtraction by the corresponding qualitative-attribute-subcategory standard deviation.

9. The method of claim 8, wherein the skew of each respective element with respect to zero numerically reflects the degree of presence of the corresponding qualitative-attribute subcategory across all N items in the database.

10. The method of claim 8, wherein computing the numeric values for each of the elements of each of the qualitative-attribute vectors further comprises, with respect to at least one qualitative-attribute subcategory, multiplying the corresponding numeric value of each of the N qualitative-attribute vectors by at least one known-relationship vector.

11. The method of claim 8, wherein computing the numeric values for each of the elements of each of the qualitative-attribute vectors further comprises, with respect to at least one qualitative-attribute subcategory, scaling the corresponding numeric value of each of the N qualitative-attribute vectors by at least one preference-weighting factor.

12. The method of claim 1, wherein generating the adjusted qualitative-attribute vector comprises setting the respective numeric value that corresponds in the adjusted qualitative-attribute vector to each user-specified qualitative-attribute subcategory to a replacement value that is substantially greater than any of the numeric values in the N qualitative-attribute vectors in the database.

13. The method of claim 12, wherein the replacement value is 100.

14. The method of claim 1, wherein computing a given item score for a given item at least in part by multiplying the adjusted qualitative-attribute vector by the qualitative-attribute vector of the given item comprises computing a dot product of the adjusted qualitative-attribute vector and the qualitative-attribute vector of the given item.

15. A search refinement system, the system comprising:
a database of a plural integer N items, wherein:
the database is structured so as to characterize each of the N items according to one or more qualitative-attribute categories that are each defined by a finite set of one or more qualitative-attribute subcategories, each qualitative-attribute category representing a respective type of physical characteristic of a given item, each qualitative-attribute subcategory representing a particular physical manifestation of the physical characteristic that the associated qualitative-attribute category represents, the database defining a total of a plural integer M qualitative-attribute subcategories; and
each of the N items is associated in the database with a respective image and a respective M-element qualitative-attribute vector, each element of each qualitative-attribute vector being a numeric value that (i) corresponds to a respective different one of the M qualitative-attribute subcategories that are defined in the database, (ii) numerically indicates whether or not the corresponding qualitative-attribute subcategory is present in the corresponding item, and (iii) numerically reflects the degree of presence of the corresponding qualitative-attribute subcategory across all N items in the database; and
a server apparatus configured to carry out a set of functions, the set of functions comprising:
transmitting, to a user device, user interface instructions that are structured to render the images of a first subset of the N items on the user device;
receiving, from the user device, a user-selected change indication that specifies (i) a user-selected reference item from the first subset and (ii) one or more user-specified qualitative-attribute subcategories that are not present in the user-selected reference item;
responsive to receiving the user-selected change indication, generating an adjusted qualitative-attribute vector that is based on the qualitative-attribute vector of the user-selected reference item, and in which the respective numeric value that corresponds to each user-specified qualitative-attribute subcategory numerically indicates the presence of that qualitative-attribute subcategory;
computing a respective item score for at least each of the N−1 items other than the user-selected reference item at least in part by multiplying the adjusted qualitative-attribute vector by the qualitative-attribute vector of the respective corresponding item;
identifying a second subset of the N items based at least in part on the computed item scores; and
transmitting, to the user device, user interface instructions that are structured to render the images of the second subset of the N items on the user device.

16. The system of claim 15, wherein identifying the second subset of the N items includes selecting for inclusion in the second subset the items with the highest computed item scores.

17. The system of claim 16, wherein the user interface instructions that are structured to render the images of the second subset of the N items on the user device are structured to render the images of the second subset of the N items on the user device in descending order of computed item score.

18. The system of claim 15, wherein the set of functions further comprises, prior to transmitting, to the user device, the user interface instructions that are structured to render the images of the first subset of the N items on the user device:
transmitting, to the user device, user interface instructions that are structured to render images of a first set of qualitative-attribute-subcategory choices on the user device;
receiving, from the user device, a user-selected qualitative-attribute subcategory from the first set of qualitative-attribute-subcategory choices; and
identifying the first subset of the N items based at least in part on the user-selected qualitative-attribute-subcategory choice.

19. The system of claim 15, wherein the set of functions further comprises:
receiving, from the user device, a user-selected filtering facet;
if the filtering facet is inclusive, including in one or both of the first subset and the second subset only items matching the user-selected filtering facet; and
if the filtering facet is exclusive, including in one or both of the first subset and the second subset only items not matching the user-selected filtering facet.

20. The system of claim 15, wherein the set of functions further comprises computing the numeric values for each of the elements of each of the qualitative-attribute vectors at least in part by:
initializing each element of each qualitative attribute vector to either (i) a 0 if the corresponding qualitative-attribute subcategory is not present in the corresponding item or (ii) a 1 if the corresponding qualitative-attribute subcategory is present in the corresponding item;
computing a respective average and a respective standard deviation of the initialized values for each respective qualitative-attribute subcategory; and
subtracting the corresponding qualitative-attribute-subcategory average from each initialized element, and then dividing the result of that subtraction by the corresponding qualitative-attribute-subcategory standard deviation.

21. The system of claim 20, wherein the skew of each respective element with respect to zero numerically reflects the degree of presence of the corresponding qualitative-attribute subcategory across all N items in the database.

22. The system of claim 20, wherein computing the numeric values for each of the elements of each of the qualitative-attribute vectors further comprises, with respect to at least one qualitative-attribute subcategory, multiplying the corresponding numeric value of each of the N qualitative-attribute vectors by at least one known-relationship vector.

23. The system of claim 20, wherein computing the numeric values for each of the elements of each of the qualitative-attribute vectors further comprises, with respect to at least one qualitative-attribute subcategory, scaling the corresponding numeric value of each of the N qualitative-attribute vectors by at least one preference-weighting factor.

24. The system of claim 15, wherein generating the adjusted qualitative-attribute vector comprises setting the respective numeric value that corresponds in the adjusted qualitative-attribute vector to each user-specified qualitative-attribute subcategory to a replacement value that is substantially greater than any of the numeric values in the N qualitative-attribute vectors in the database.

25. The system of claim 24, wherein the replacement value is 100.

26. The system of claim 15, wherein computing a given item score for a given item at least in part by multiplying the adjusted qualitative-attribute vector by the qualitative-attribute vector of the given item comprises computing a dot product of the adjusted qualitative-attribute vector and the qualitative-attribute vector of the given item.

* * * * *